(12) United States Patent
Young et al.

(10) Patent No.: US 6,581,386 B2
(45) Date of Patent: Jun. 24, 2003

(54) THREADED COMBUSTOR BAFFLE

(75) Inventors: Craig Douglas Young, Maineville, OH (US); Paul James Ogden, Mason, OH (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 09/967,648

(22) Filed: Sep. 29, 2001

(65) Prior Publication Data

US 2003/0061815 A1 Apr. 3, 2003

(51) Int. Cl.$^7$ .............................. F02C 7/00
(52) U.S. Cl. ............... 60/748; 60/798; 29/890.01
(58) Field of Search .............. 60/798, 748; 29/980.01

(56) References Cited

U.S. PATENT DOCUMENTS

| | | | |
|---|---|---|---|
| 2,959,003 A | * 11/1960 | Carlisle et al. | ............... 60/742 |
| 3,385,055 A | 5/1968 | Kobish et al. | |
| 4,454,711 A | 6/1984 | Ben-Porat | |
| 4,689,961 A | 9/1987 | Stratton | |
| 4,763,482 A | 8/1988 | Wehner | |
| 5,197,289 A | 3/1993 | Glevicky et al. | |
| 5,289,687 A | 3/1994 | Kress et al. | |
| 5,321,951 A | 6/1994 | Falls et al. | |
| 5,329,761 A | 7/1994 | Ablett et al. | |
| 6,298,667 B1 | * 10/2001 | Glynn et al. | ............... 60/737 |
| 6,442,940 B1 | * 9/2002 | Young et al. | ............... 60/748 |

OTHER PUBLICATIONS

GE Aircraft Engines, "Double Dome Combustor, LM Engine," one–page schematic of combustor portion on–sale or in use for more than one year.

* cited by examiner

*Primary Examiner*—Ehud Gartenberg
(74) *Attorney, Agent, or Firm*—Nathan D. Herkamp; Francis L. Conte

(57) ABSTRACT

A combustor baffle includes an outer tube with external threads and a heat shield at opposite ends thereof. An inner tube is disposed inside the outer tube in a unitary assembly therewith. The outer tube is retained in a combustor dome by a retention nut, and the inner tube supports an air swirler with a brazed joint therewith. The brazed joint permits sacrifice of the baffle during disassembly for access to the threaded joint for final disassembly without damage to the dome or air swirler.

27 Claims, 4 Drawing Sheets

THREADED COMBUSTOR BAFFLE

BACKGROUND OF THE INVENTION

The present invention relates generally to gas turbine engines, and, more specifically, to combustors therein.

In a gas turbine engine, air is pressurized in a compressor and mixed with fuel and ignited in a combustor for generating hot combustion gases. The hot gases flow downstream through several turbine stages which extract energy therefrom for powering the compressor, and providing output work in the exemplary form of powering a fan in a turbofan engine configured for powering an aircraft in flight.

Since the hot combustion gases are first generated in the combustor, the combustor and its associated components must be specifically configured for withstanding the high temperatures of combustion and providing a suitable useful life. The various combustor components are typically cooled during operation by channeling therethrough relatively cool air bled from the compressor discharge.

A typical combustor includes radially outer and inner annular liners attached at forward ends to an annular combustor dome. The dome is a thin plate extending radially between the two liners and may be configured for supporting a single row of carburetors in a single annular design, or two carburetor rows in a double annular design, or even more rows. Nevertheless, each carburetor typically includes an air swirler which swirls and mixes air with fuel injected from a respective fuel injector. The fuel and air mixture is ignited and generates the hot combustion gases immediately downstream from the dome.

The dome is typically protected from the high heat of combustion by individual heat shields or splashplates disposed inside the dome at the aft end of each swirler. The heat shields generally have four sides or edges and collectively form an annular heat shield inside the dome for each row of carburetors.

Modem aircraft gas turbine engines are designed for long life with minimal repair or maintenance requirements. The air swirler, combustor dome, and combustor liners are well cooled during operation and have correspondingly long useful lives. However, the individual heat shields in view of their fundamental function of protecting the combustor dome from the high heat generated during combustor operation, are typically replaced several times during the useful life of the combustor and engine.

The cost of replacing the heat shields in a typical maintenance outage scheduled therefor is substantial in view of the large number of heat shields which must be replaced in the outage; the complexity of the mounting configuration therefor; the complexity of the removal process; and the complexity of the assembly process.

For example, in a typical combustor design the heat shields are assembled through a corresponding aperture in the dome in an annular joint therewith, as well as in a corresponding joint with the air swirler. These joints are typically brazed for creating a permanent connection with the dome.

Since the dome, heat shield, and swirler represent three components which must be assembled together and brazed, they are subject to inadvertent misassembly thereof which becomes permanent upon brazing. Excessive misalignment requires disassembly of the components and suitable correction, with a corresponding cost associated therewith.

Since the swirler and combustor dome include a multitude of small cooling holes therefor, some of those holes are subject to inadvertent plugging during the brazing operation due to their close proximity to the braze joints.

In order to repair the combustor after extended use in a maintenance outage, or to correct misassembly during initial manufacture, a brazed joint must be suitably broken for disassembling the components. Since the heat shield is a consumable or replaceable component it may be machined or cut as required without regard to its cost. However, the machining operation must be done with sufficient care to prevent damage to the dome or the air swirler which are designed for long life. The repair process, therefore, requires substantial time to individually machine and disassemble each of the carburetors from the dome, and then reassemble and re-braze the repaired assembly thereof.

Accordingly, it is desired to provide a combustor having an improved heat shield assembly with the combustor dome for improving the assembly and disassembly processes thereof.

BRIEF SUMMARY OF THE INVENTION

A combustor baffle includes an outer tube with external threads and a heat shield at opposite ends thereof. An inner tube is disposed inside the outer tube in a unitary assembly therewith. The outer tube is retained in a combustor dome by a retention nut, and the inner tube supports an air swirler with a brazed joint therewith. The brazed joint permits sacrifice of the baffle during disassembly for access to the threaded joint for final disassembly without damage to the dome or air swirler.

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
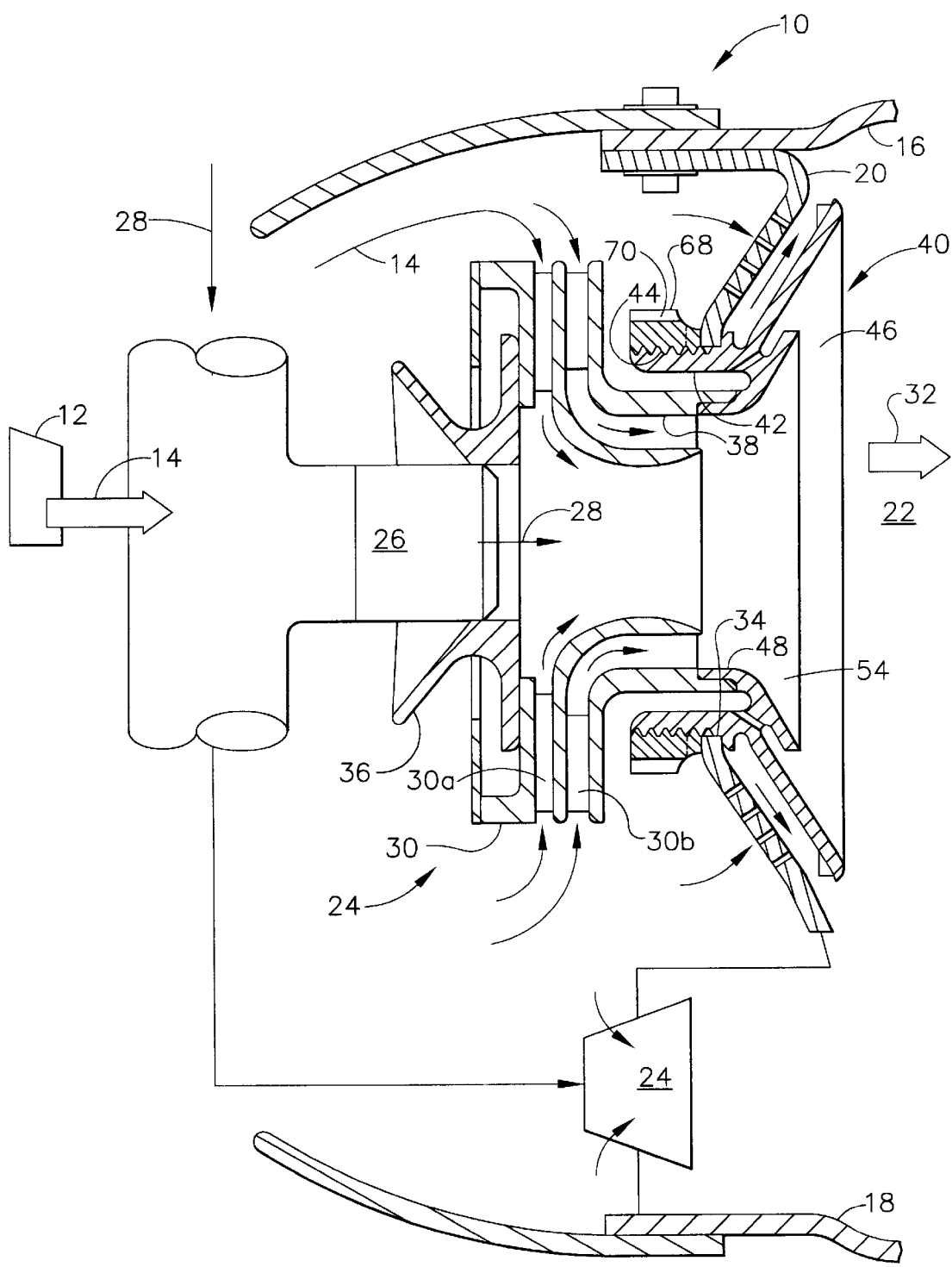
FIG. 1 is an axial sectional view of a portion of a double annular combustor in accordance with an exemplary embodiment of the present invention.

Illustrated in FIG. 1 is the forward or upstream portion of an annular combustor 10 of a gas turbine engine. The engine itself includes a multistage axial compressor 12 configured for pressurizing air 14 which is discharged into the combustor.

The combustor includes an annular radially outer liner 16, an annular radially inner liner 18 spaced therefrom, and an annular dome 20 fixedly joined to the upstream or forward ends of the two liners. The liners and dome are formed of thin sheet metal or plate and collectively define therein an annular combustor chamber 22, only the upstream portion thereof being illustrated.

The combustor includes one or more rows of carburetors 24 each having a fuel injector 26 for injecting fuel 28 through the dome and into the combustor. Each carburetor also includes an annular air swirler 30 which receives a portion of the compressor discharge air 14 and swirls the air around the injected fuel for mixing therewith. The fuel and air mixture is then ignited for generating hot combustion gases 32 which flow through the combustor for discharge through several turbine stages (not shown). The turbines extract energy from the gases for powering the compressor 12 as well as providing useful output work.

The engine may have any conventional configuration for land, marine, or air applications, and in a preferred embodiment is configured as a turbofan gas turbine engine for powering an aircraft in flight. In this configuration, a high pressure turbine powers the compressor 12, and a downstream low pressure turbine powers a fan (not shown) disposed upstream of the compressor.

Figure 2:
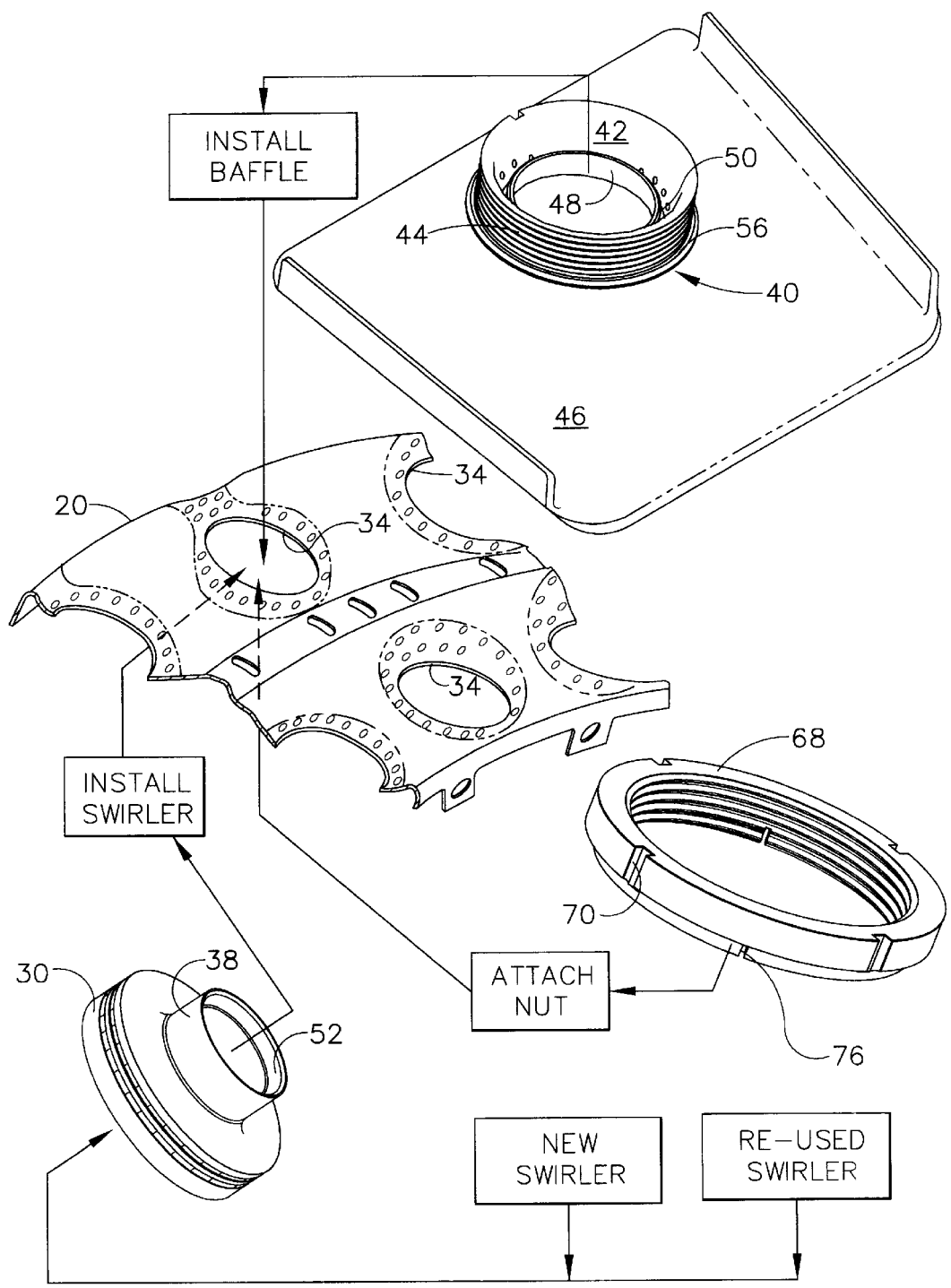
FIG. 2 is an exploded view of the combustor illustrated in FIG. 1 showing assembly of the dome components thereof in an exemplary flowchart.

As illustrated in FIGS. 1 and 2, the combustor dome is a double annular dome including two rows of dome apertures 34 extending axially therethrough in which the individual carburetors are mounted. The basic carburetors may have any conventional form, and typically include a floating ferrule 36 which receives the tip or nozzle of the fuel injector 26. Each swirler 30 preferably includes two rows of air swirler vanes 30a,b formed in a common casting including an integral mounting sleeve 38 which extends aft from the swirl vanes coaxially therewith in the form of a cylindrical tube.

The two rows of swirl vanes 30a,b are preferably inclined oppositely from each other so that the air enters the first row 30a and is swirled in one direction around the injected fuel 28, and additional air is channeled through the second row of vanes 30b and is swirled in an opposite direction. The two rows of vanes are separated by a septum in the form of a venturi in a conventional manner.

Since the combustor dome 20 illustrated in FIG. 1 bounds the upstream end of the combustion chamber 22, it is subject to the hot combustion gases formed during operation. In order to protect the combustor dome, the combustor includes a plurality of baffles 40 similarly mounted in respective ones of the dome apertures 34 for respectively mounting the individual carburetors thereto. The baffles are configured in accordance with the present invention as consumable or replaceable parts which protect the combustor dome, and provide a convenient manner of mounting the carburetors, with improvements in assembly and disassembly thereof.

More specifically, each combustor baffle as initially illustrated in FIG. 1 includes a cylindrical outer tube 42 having external screw threads 44 at the forward or upstream end thereof. The downstream or aft end of the outer tube includes a quadrilateral splashplate or heat shield 46 integrally joined thereto. As shown in FIG. 2, the heat shield 46 is generally rectangular or trapezoidal with two straight sides extending in the radial direction of the combustor, and two arcuate radially outer and inner edges forming the four sided perimeter thereof.

Each baffle 40 also includes a cylindrical inner tube 48 disposed radially inwardly or concentrically inside the outer tube, and is integrally joined to the outer tube in preferably unitary assembly therewith such as a common casting.

Figure 3:
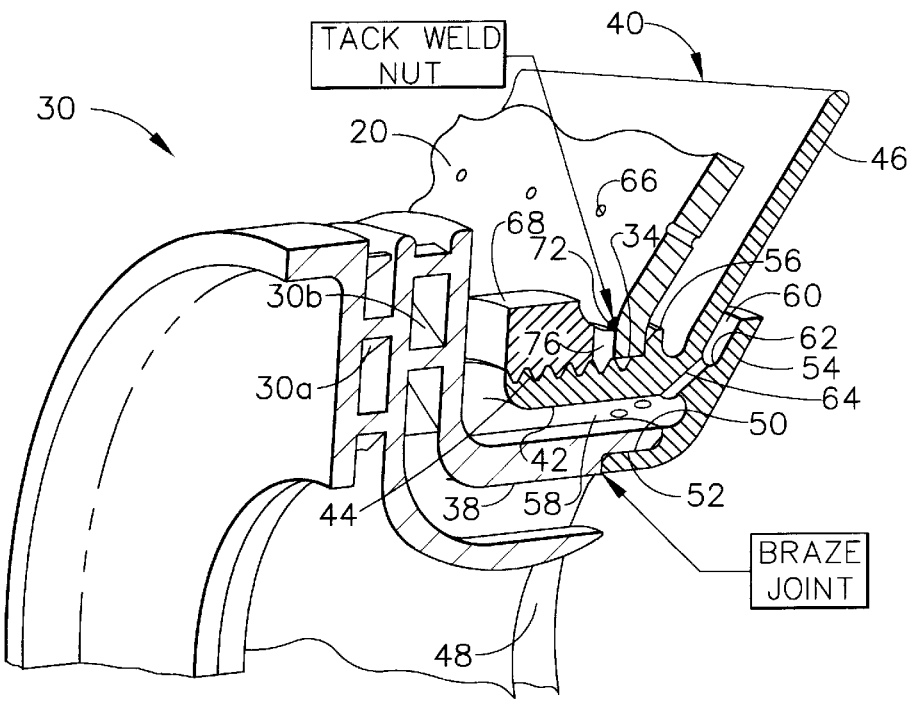
FIG. 3 is an enlarged, axial sectional view through the top portion of the exemplary carburetor illustrated in FIG. 1 in completing the assembly thereof.

As shown in FIG. 3 the inner tube 48 includes an annular forward step or dado 50 at the forward end thereof around its outer perimeter.

Correspondingly, the mounting sleeve 38 of the air swirler includes an annular aft step or dado 52 around its aft end along the inner diameter thereof. The two dados 50,52 are joined together in a lap joint formed by conventional brazing thereof. In this way, the unitary air swirler 30 is integrally joined to the unitary baffle 40 in a unitary assembly formed by the braze joint at the corresponding lap joint therebetween.

The aft end of the inner tube 48 includes an annular flare cone 54 integrally joined thereto preferably in the one piece casting therewith, and with the outer tube 42 and the heat shield 46.

The integrated baffle 40 is specifically configured for mounting the air swirler 30 thereto at the dado lap joint, and in turn mounting the assembly thereof to the combustor dome through the aperture therein. The outer tube 42 extends through the aperture from the aft end of the dome plate inside the combustor and preferably includes an annular shoulder or step 56 in the form of a radial flange disposed between the threads 44 and the heat shield 46. The step limits the travel of the baffle through the dome aperture and preferentially spaces the heat shield 46 from the inner surface of the dome plate.

As shown in FIG. 3 the inner tube 48 is preferably spaced radially inwardly from the outer tube 42 to define a forward annular channel 58 therebetween. And, the flare cone 54 is preferably spaced aft from the heat shield 56 to define an aft annular channel 60 therebetween.

The flare cone 54 is preferably integrally joined to the outer tube 52 by an annular ligament 62. The ligament is disposed aft of the lap joint and on the forward side of the flare cone, and is joined to the outer tube 42 at its junction with the heat shield 46. A row of through holes 64 extends axially through the ligament, and joins together in flow communication the forward and aft channels 58,60.

The forward channel 58 is open at its forward end between the sleeve 38 and the outer tube 42 for receiving the compressor air 14 which is then channeled through the holes 64 to impingement cool the back side of the flare cone 54 prior to discharge into the combustor. The flare cone is preferably smaller than the heat shield and cooperates with the air swirler for spreading the fuel and air mixture into the combustor for ignition therein. And, the heat shield 46 protects the combustor dome from the hot combustion gases and thermal radiation generated by ignition of the mixture.

The air channeled through the holes 64 provides cooling for both the flare cone and the heat shield. And, the combustor dome includes a multitude of impingement holes 66 which direct the cooling air against the forward side of the heat shield 46 for cooling thereof prior to discharge into the combustor around the four edges of the heat shield.

As shown in FIGS. 2 and 3, the combustor baffle also includes a retaining or locking nut 68 having internal threads which join the nut to the external threads around the outer tube. The outer tube 42 extends through the dome aperture to seat the step 56 against the surrounding dome on the aft side thereof, and the nut 68 threadingly engages the outer tube on the opposite forward side of the dome to clamp the dome against the step.

In this way, the nut 68 may be used to securely clamp the baffle through the dome aperture 34 on opposite sides of the dome plate. The mounting step 56 ensures accurate alignment of the baffle in the dome aperture and maintains a preferred spacing between the dome and heat shield for flow of the cooling air therebetween.

The threaded baffle 40 described above enjoys many benefits in the initial assembly and subsequent repair of the combustor. For example, FIG. 2 illustrates schematically the assembly of the baffle and the swirler in each of the dome apertures 34. The unitary baffle 40 is first installed from the aft side of the combustor dome by inserting the outer tube 42 through the dome aperture 34.

The retaining nut 68 may then be installed from the forward side of the dome plate to threadingly engage the external threads 44. The nut may have any suitable form and preferably includes a plurality of circumferentially spaced apart wrench sockets 70 configured for engagement with a conventional spanner wrench (not shown). Four of the wrench sockets 70 are illustrated in FIG. 2 and are spaced 90 degrees from each other in the radially outer surface of the nut. The sockets are preferably open at the opposite axial ends and define axial slots in the perimeter of the nut. In this way, the spanner wrench may engage the socket 70 to permit effective torque on the nut to clamp the baffle in position through the corresponding dome apertures.

As shown in FIG. 3, the tightened nut 68 is preferably fixedly joined to the dome by a plurality of tack welds 72 made in the exposed fillet region of the nut where its aft face abuts the forward face of the dome plate. In this way, the baffle 40 and its retaining nut 68 are fixedly secured to the dome plate and cannot rotate or be liberated during operation.

As shown in FIGS. 2 and 3, the individual swirler 30 may then be assembled from the forward side of the combustor for engaging together the forward and aft dados 50,52. The corresponding lap joint formed thereby may then be conveniently brazed together from the aft side of the dome plate. This process is repeated for each of the combustor baffles and corresponding air swirlers for the full complement thereof in the combustor dome.

The threaded combustor baffle 40 enjoys improved self alignment during assembly by the seating arrangement of the combustor dome against the baffle step 56 and clamping thereagainst by the assembled nut 68. Correspondingly, the forward dado 50 and the aft dado 52 of the baffle and air swirler provide an accurate assembly of these two components which may then be brazed together for permanent alignment thereof. This combined mechanical and brazed assembly of the baffle and swirler therefore enjoys simplicity of construction, and assembly with improved accuracy and access not provided by an all brazed assembly of swirlers and heat shields in conventional practice.

Furthermore, the outer tube 42 is mechanically joined to the dome plate without the need for brazing thereat, and therefore the small impingement holes 66 are not subject to being inadvertently plugged during the brazing process. And, the through hole 64 in the ligament 62 are located oppositely from the lap joint and are protected from being inadvertently plugged during the brazing operation of the dado joint.

Another significant advantage of the threaded baffle configuration described above is the improvement in repairing the combustor for replacement of the baffles during a maintenance outage, or due to initial assembly thereof not meeting required specifications. The preferred method of repair is initially illustrated in FIG. 4 wherein a conventional machine tool 74, such as an end mill, may be used for machining the flare cone 54 around it circumference immediately aft of the lap joint defined by the two dados 50,52 to sever and free the air swirler 30 therefrom. The swirler may then be removed from inside the baffle by axially forward movement thereof.

The individual tack welds 72 may then be conventionally removed by machining or grinding to free the nut 68 from the dome 20.

In the event of removal of a new baffle 46 not subject to oxidation from extended use, the spanner wrench may be used for removing the nut 68 from the outer tube 42, which then permits the simple removal of the liberated baffle 40 from the dome.

However, in a maintenance outage scheduled for replacement of used combustor baffles, those baffles would typically have substantial oxidation due to the hot environment of the combustor over extended time. The threaded nut 68 will therefore be most likely heat-frozen to the outer tube due to oxidation buildup between the threads therebetween which will prevent disassembly thereof using a normal amount of removal torque on the nut.

For this situation, the nut 68 as illustrated in FIGS. 2 and 3 preferably includes at least one radial relief slot or notch 76 disposed in the aft end or face thereof. In the exemplary embodiments illustrated in FIG. 2 there are four of the relief notches 76 spaced circumferentially apart 90 degrees from each other around the circumference of the nut 68, with each relief notch 76 being disposed or offset circumferentially between respective ones of the wrench sockets 70 at about a 45 degree spacing therewith.

Figure 4:
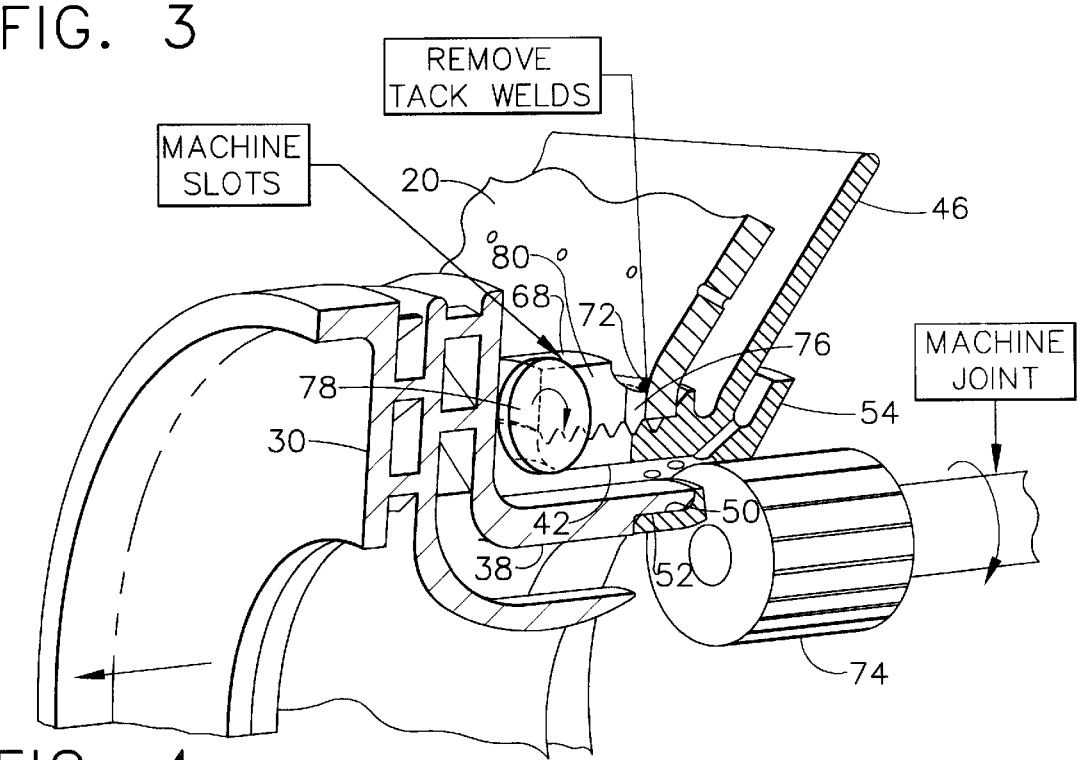
FIG. 4 is an enlarged, axial sectional view of the carburetor portion illustrated in FIG. 3 showing disassembly thereof in an exemplary method of repair.

Accordingly, during the repair process illustrated in FIG. 4 another machine tool 78 is then used for machining or cutting a slot 80 through the forward end of the nut and outer tube to reach a respective one of the relief notches 76 and completely sever the circumferential continuity of the nut. A single circumferential split in the nut may be sufficient to relieve its retention force and permit its removal notwithstanding the friction in the threads provided by oxidation during use.

Figure 5:
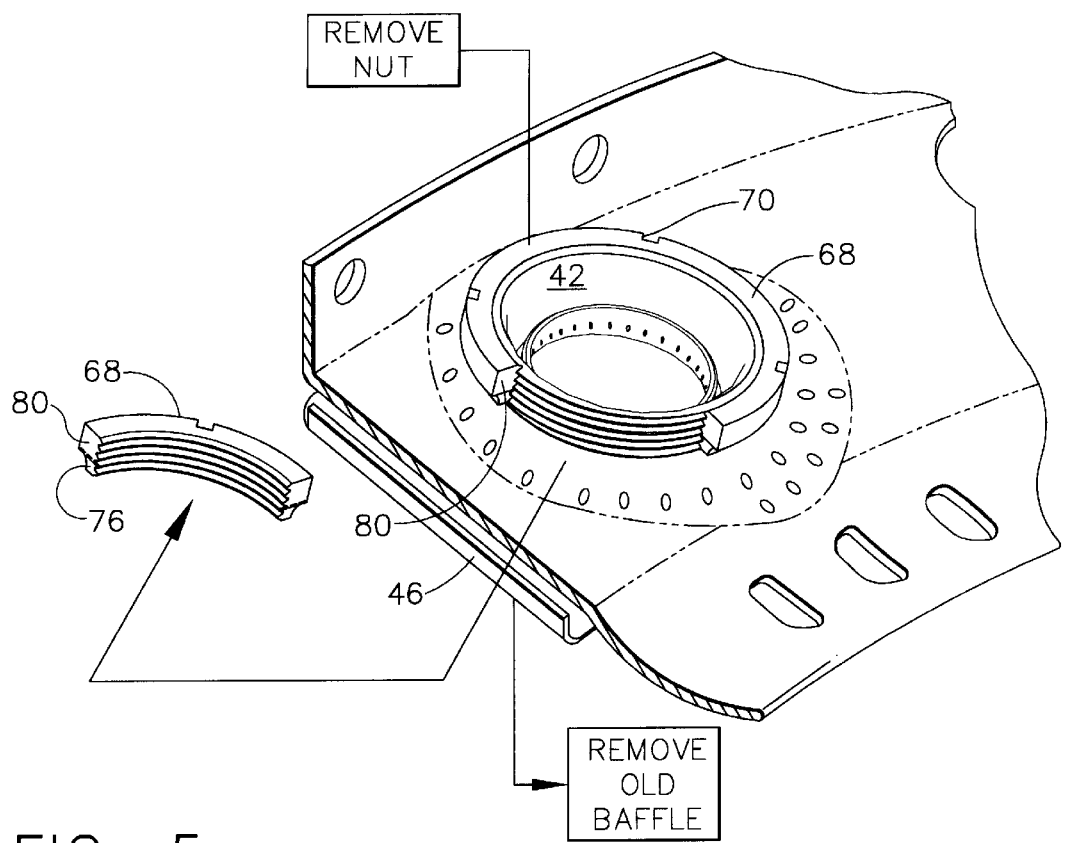
FIG. 5 is an exploded, isometric view of the forward side of the combustor dome and baffle therein showing final removal thereof.

However, two spaced slots 80 may be cut in the nut 68 as illustrated in FIG. 5 for permitting the arcuate nut section therebetween to be removed from the outer tube 42. The remaining section of the nut 68, with a substantial gap therein provided by the removed section thereof, may be conveniently removed in any suitable fashion such as by applying the spanner wrench to the remaining sockets 70 and unthreading the nut portion from the outer tube.

A particular advantage of providing the precuts or relief notches 76 as illustrated in FIGS. 3 and 4, is that subsequent cutting of the removal slots 80 is limited to reaching the relief notches 76 for preventing inadvertent damage to the combustor dome 20 itself during the repair process. The slot cutting tool 78 may have any conventional form such as a grinding wheel or electrical discharge machining (EDM) wire which may be accurately used to cut the removal slots 80 down to the corresponding relief notches.

Although the cutting operation also cuts through the external threads of the outer tube itself that tube is an integral portion of the combustor baffle 40 being discarded as a consumable component. And, although the combustor baffle itself is discarded, the removed air swirler 30 may be refurbished and used again for one or more replacement baffles for enjoying its full useful life. In this repair process, the combustor dome is not damaged and may also be reused for its full useful life.

Figure 6:
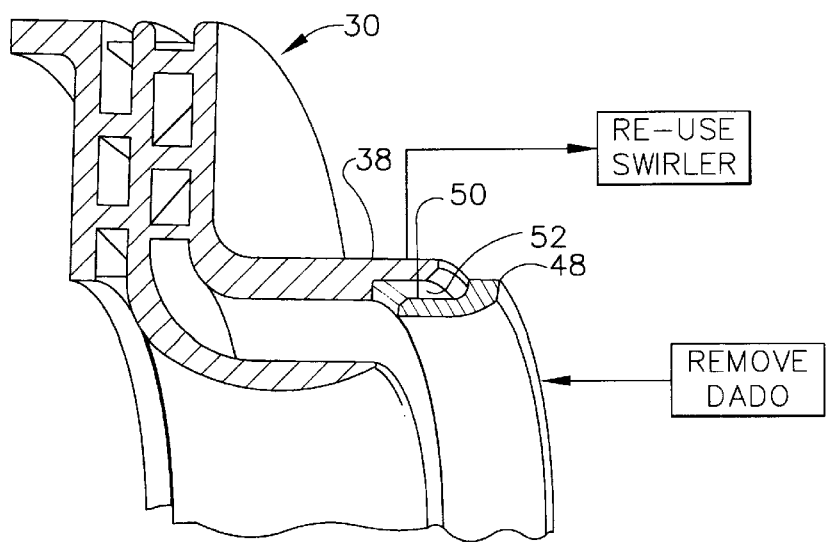
FIG. 6 is an enlarged, axial sectional view through the portion of the air swirler illustrated in FIG. 4 showing removal of the final portion of the original baffle at the mounting dado thereof for reuse of the swirler in the assembly process illustrated in FIG. 2.

FIG. 6 illustrates schematically refurbishment of the removed air swirler 30 for subsequent reuse in the assembly process illustrated in FIG. 2. In FIG. 6, the forward dado 50 of the inner tube 48 is machined away from the sleeve 38 of the air swirler to restore the aft dado 52 thereof to substantially its original shape. Since the inner tube 48 was previously brazed to the sleeve 38, machining may be used for removing the inner tube at the relatively soft braze joint therebetween for restoring the aft dado 52.

The so-restored air swirler 30 illustrated in FIG. 6 may then be used again in the same or different combustor dome 20 illustrated in FIG. 2 in combination with another, new combustor baffle 40 and new retention nut 68.

Accordingly, the air swirler 30, which has a useful life substantially longer than that of the individual combustor baffles, may be reused one or more times for each subsequent maintenance outage in which the combustor baffles are replaced until the useful life of the air swirler is reached.

The threaded combustor baffle 40 disclosed above provides a unitary element for permitting the convenient and accurate assembly of the air swirler 30 therewith for mounting through the corresponding dome apertures. The external threads 44 are specifically located on the outer tube 42 for permitting convenient assembly of the baffle 40 and its retention nut 68 in a clamped configuration in the dome plate.

The nut may be conveniently tack welded to the dome plate without interference by the yet to be assembled air swirler 30. The air swirler may then be conveniently assembled to the inner tube 48 by the two interconnecting dados 50,52 which permit accurate self-alignment between the swirler and baffle. Brazing of the lap joint is then conveniently effected from the aft end of the combustor dome for completing the assembly of the swirler, baffle, and combustor dome at the corresponding dome aperture. The process is repeated for each dome aperture to complete the dome assembly.

The subsequent repair process during a maintenance outage permits convenient liberation of an individual air swirler 30 by severing the lap joint in the sacrificial baffle at the flare cone 54. The retention nut may be liberated from the dome plate and the baffle by removing the tack welds and severing the nut at the relief notches. And, the removed air swirler may be conveniently refurbished by simply removing the remaining portion of the inner tube from the aft dado thereof, with the refurbished air swirler then being available for reuse in the same or another combustor.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A combustor baffle comprising:
   an outer tube having external threads at a forward end thereof, and a quadrilateral heat shield integrally joined to an aft end thereof; and
   an inner tube disposed concentrically inside said outer tube, and integrally joined to said outer tube.

2. A baffle according to claim 1 wherein said inner tube includes an annular dado at a forward end thereof.

3. A baffle according to claim 2 wherein said inner tube further includes an annular flare cone at an aft end thereof integrally joining said inner tube to said outer tube.

4. A baffle according to claim 3 wherein said outer tube further includes an annular step disposed between said threads and heat shield.

5. A baffle according to claim 4 wherein said inner tube is spaced radially inwardly from said outer tube to define a forward annular channel therebetween.

6. A baffle according to claim 5 wherein said flare cone is spaced aft from said heat shield to define an aft annular channel therebetween.

7. A baffle according to claim 6 wherein said flare cone is joined to said outer tube by an annular ligament having a row of holes extending therethrough joining together in flow communication said forward and aft channels.

8. A baffle according to claim 7 further comprising a retaining nut threadingly joined to said external threads.

9. A baffle according to claim 8 wherein said nut includes a plurality of circumferentially spaced apart relief notches disposed at an aft end thereof.

10. A baffle according to claim 9 wherein said nut further includes a plurality of circumferentially spaced apart wrench sockets disposed in a radially outer surface thereof.

11. A baffle according to claim 10 wherein said relief notches are disposed circumferentially between respective ones of said wrench sockets.

12. A baffle according to claim 11 in combination with a combustor dome having an aperture therethrough, and said outer tube extends through said aperture to seat said step against said surrounding dome on an aft side thereof, and said nut threadingly engages said outer tube on an opposite forward side of said dome to clamp said dome against said step.

13. A baffle combination according to claim 12 wherein said nut is fixedly joined to said dome by a plurality of tack welds therebetween at said aft end of said nut.

14. A baffle combination according to claim 13 further comprising an air swirler having a mounting sleeve with a dado at an aft end thereof brazed coaxially with said dado of said outer tube in a lap joint therewith.

15. A method of repairing said baffle combination according to claim 14 comprising:
   machining said flare cone aft of said lap joint to free said swirler therefrom;
   removing said tack welds to free said nut from said dome;
   machining a slot through said nut and outer tube to reach one of said relief notches and sever the circumferential continuity of said nut;
   removing said nut from said outer tube; and
   removing said baffle from said dome.

16. A method according to claim 15 further comprising:
   machining said forward dado from said swirler to restore said aft dado to shape; and
   reusing said restored swirler in another combustor dome in combination with another baffle and nut.

17. A combustor comprising:
   a dome having an aperture extending therethrough; and
   a baffle mounted in said dome aperture, and including:
   an outer tube having external threads at a forward end thereof, and a quadrilateral heat shield integrally joined to an aft end thereof;
   an inner tube disposed concentrically inside said outer tube, and integrally joined to said outer tube; and
   a retaining nut threadingly joined to said external threads.

18. A combustor according to claim 17 wherein said inner tube includes an annular forward dado at a forward end thereof, and further comprising an air swirler having a mounting sleeve with an aft dado at an aft end thereof brazed coaxially with said forward dado of said outer tube in a lap joint therewith.

19. A combustor according to claim 18 wherein said outer tube further includes an annular step disposed between said threads and heat shield, and said outer tube extends through said aperture to seat said step against said surrounding dome on an aft side thereof, and said nut threadingly engages said outer tube on an opposite forward side of said dome to clamp said dome against said step.

20. A combustor according to claim 19 wherein:

said inner tube is spaced radially inwardly from said outer tube to define a forward annular channel therebetween; and said inner tube further includes an annular flare cone at an aft end thereof integrally joining said inner tube to said outer tube, with said flare cone being spaced aft from said heat shield to define an aft annular channel therebetween.

21. A combustor according to claim 20 wherein said flare cone is joined to said outer tube by an annular ligament having a row of holes extending therethrough joining together in flow communication said forward and aft channels.

22. A combustor according to claim 21 wherein said nut includes a plurality of circumferentially spaced apart relief notches disposed at an aft end thereof.

23. A combustor according to claim 22 wherein said nut further includes a plurality of circumferentially spaced apart wrench sockets disposed in a radially outer surface thereof.

24. A combustor according to claim 23 wherein said relief notches are disposed circumferentially between respective ones of said wrench sockets.

25. A combustor according to claim 24 wherein said nut is fixedly joined to said dome by a plurality of tack welds therebetween at said aft end of said nut.

26. A method of repairing said combustor according to claim 25 comprising:

machining said flare cone aft of said lap joint to free said swirler therefrom;

removing said tack welds to free said nut from said dome;

machining a slot through said nut and outer tube to reach one of said relief notches and sever the circumferential continuity of said nut;

removing said nut from said outer tube; and removing said baffle from said dome.

27. A method according to claim 26 further comprising:

machining said forward dado from said swirler to restore said aft dado to shape; and reusing said restored swirler in another combustor dome in combination with another baffle and nut.

* * * * *